No. 796,575. PATENTED AUG. 8, 1905.
M. E. GOOD.
SLED RUNNER.
APPLICATION FILED JAN. 24, 1905.
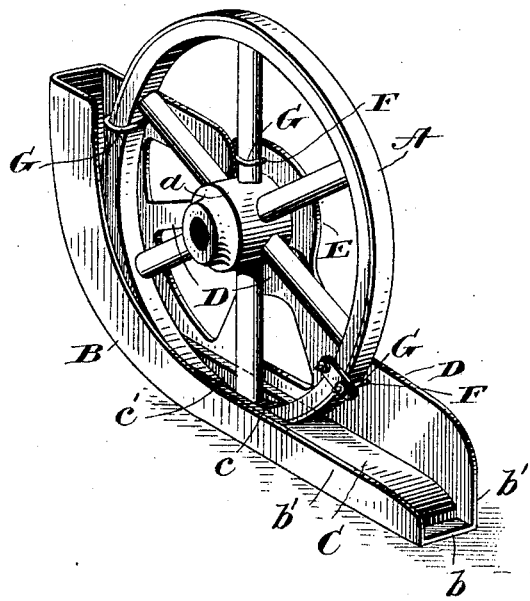
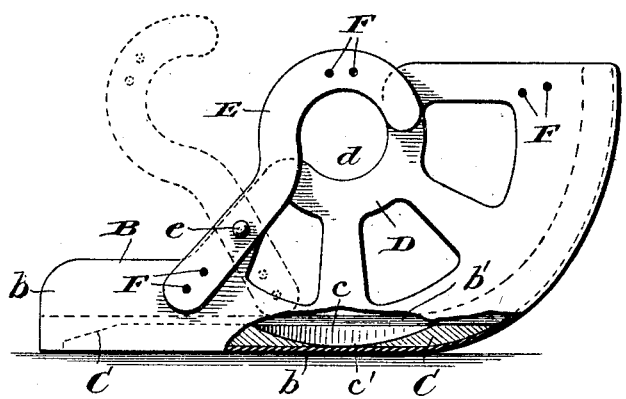
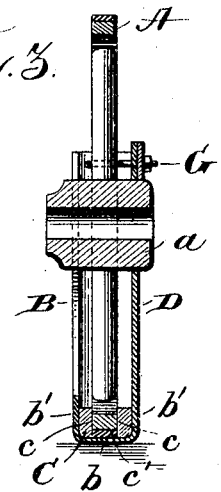
Witnesses:
Jas. E. Hutchinson
H. E. Stonebraker.
Inventor:
Mary E. Good,
By McMilam Attorneys

UNITED STATES PATENT OFFICE.

MARY E. GOOD, OF DECATUR, ILLINOIS.

SLED-RUNNER.

No. 796,575.      Specification of Letters Patent.      Patented Aug. 8, 1905.

Application filed January 24, 1905. Serial No. 242,572.

*To all whom it may concern:*

Be it known that I, MARY E. GOOD, a citizen of the United States, residing at Decatur, in the county of Macon and State of Illinois, have invented certain new and useful Improvements in Sled-Runners, of which the following is a specification, reference being had therein to the accompanying drawings.

This invention relates to a novel runner attachment for wheels of vehicles, and has for an object the provision of a device of this character possessing improved characteristics rendering the same rigid and strong and also readily applicable to the vehicle in connection with which the same is adapted for use.

A convenient embodiment of the invention is illustrated in the accompanying drawings and will be hereinafter described in detail, it being noted that the invention as disclosed in said embodiment embraces a metallic runner having side flanges and a wooden or similar wheel-seat fitted therewithin and between said side flanges, also the furnishing of one of the side flanges of the runner with an upwardly-extending extension flange or plate having a concaved seat in its upper edge fashioned to receive and support the hub of a wheel, and, still further, the provision of a releasable locking device adapted to engage the upper portion of the hub of the wheel to brace the runner portion of the attachment and more securely fasten the same to the wheel.

In the drawings, Figure 1 is a perspective view of the attachment as applied to a wheel. Fig. 2 is a similar view looking at the reverse side of the attachment, the attachment being removed from the wheel; and Fig. 3 is a transverse sectional view through the runner portion of the attachment, including the wheel-seat.

Referring more specifically to the drawings, wherein like reference characters refer to corresponding parts in the several views, A designates the wheel of an ordinary wheeled vehicle to which the attachment is shown as applied.

B represents the runner portion of the attachment, the same having the usual horizontally-disposed section and an upwardly-curved forward section. Upon an inspection of Fig. 3 it will be seen that this runner portion has a tread $b$ and upwardly-extending side or edge flanges $b'$. Owing to this U configuration, it will be appreciated that the whole of the runner may readily be made of metal, which is obviously desirable. The tread-surface $b$ is broad, and to enable proper seating of the wheel A therein I provide a wheel-seat C, the latter being in the nature of an elongated block of wood or similar material snugly fitting within the runner portion B and fastened in place by nailing the same to the side flanges thereof. This block C has side walls $c$ adjoining the side flanges $b'$ and bordering an intervening space $c'$, fashioned to receive the lowermost part of the wheel-rim.

One of the side flanges $b'$ is furnished with an upwardly-extending extension flange or plate D, provided with a concaved seat $d$ in its upper edge arranged to receive and support the hub $a$ of the wheel A, and a releasable locking device E is pivoted at $e$ to the heel of the runner portion B and fashioned to overlie or embrace the upper portion of the hub in opposition to the seat $d$, the two completely inclosing said hub. The flange or plate D, as also the locking device E, is formed with a series of apertures F, coöperating with clamping bolts and nuts G, provided for engagement with the wheel rim and spokes to secure the parts in place, as is apparent from the drawings.

It is to be understood that the invention is susceptible of various embodiments other than that disclosed herein.

Having thus described the invention, what is claimed as new, and desired to be secured by Letters Patent, is—

1. In an attachment of the character described, a metallic runner having side flanges and a wooden or similar wheel-seat fitted therein and confined in place between said side flanges, said seat having side walls adjoining the side walls of the runner and bordering an intervening space within which a wheel is adapted to fit, in combination with means for removably securing the attachment to the wheel.

2. In an attachment of the character described, a metallic runner having side flanges and a wooden or similar wheel-seat fitted therein and confined in place between said side flanges, in combination with means for removably securing the attachment to the wheel.

3. In an attachment of the character described, a metallic runner having side flanges and a wooden or similar wheel-seat fitted therein and confined in place between said side flanges, in combination with means for removably securing the attachment to the wheel, and an upwardly-extending extension flange or plate on one of the side flanges of the runner having a concaved seat in its upper edge adapted to receive and support the hub of the wheel.

4. In an attachment of the character described, a runner portion provided with a seat for a wheel, and an upwardly-extending extension flange or plate thereon having a concaved seat in its upper edge adapted to receive and support the hub of the wheel, in combination with means for removably securing the attachment to the wheel.

5. In an attachment of the character described, a metallic runner having side flanges and a wooden or similar wheel-seat fitted therein and confined in place between said side flanges, in combination with means for removably securing the attachment to the wheel, and an upwardly-extending extension flange or plate on one of the side flanges of the runner having a concaved seat in its upper edge adapted to receive and support the hub of the wheel, and a releasable locking device adapted to surround the upper portion of the hub.

6. In an attachment of the character described, a runner portion provided with a seat for a wheel, and an upwardly-extending extension flange or plate thereon having a concaved seat in its upper edge adapted to receive and support the hub of the wheel, in combination with means for removably securing the attachment to the wheel, and a releasable locking device adapted to surround the upper portion of the hub.

7. In an attachment of the character described, a runner portion provided with a seat for a wheel, and means thereon for securing the same to the wheel including a releasable locking device adapted to engage the upper portion of the hub of the wheel.

8. In an attachment of the character described, a runner portion provided with a seat for a wheel, and means thereon for securing the same to the wheel including a pivoted releasable locking device adapted to engage the upper portion of the hub of the wheel.

9. In an attachment of the character described, a runner portion provided with a seat for a wheel, and a releasable locking device pivoted to the heel of the runner and adapted to engage the upper portion of the hub of the wheel.

In testimony whereof I affix my signature in presence of two witnesses.

MARY E. GOOD.

Witnesses:
F. R. GOODE,
J. A. MERIWEATHER.